United States Patent
Lin

(10) Patent No.: US 7,568,646 B2
(45) Date of Patent: Aug. 4, 2009

(54) FOOD PROCESSOR

(76) Inventor: Wei-Chih Lin, No. 27, Huairen St., Banchiao City, Taipei (TW)

( * ) Notice: Subject to any disclaimer, the term of this patent is extended or adjusted under 35 U.S.C. 154(b) by 230 days.

(21) Appl. No.: 11/783,279

(22) Filed: Apr. 6, 2007

(65) Prior Publication Data

US 2008/0245202 A1 Oct. 9, 2008

(51) Int. Cl.
*B02C 4/06* (2006.01)
*B02C 4/18* (2006.01)

(52) U.S. Cl. .................. 241/282.1; 241/282.2

(58) Field of Classification Search ............ 241/282.1, 241/282.2, 95, 92; 99/510, 511, 513
See application file for complete search history.

(56) References Cited

U.S. PATENT DOCUMENTS 4,471,915 A * 9/1984 Levin et al. ............... 241/37.5
5,355,784 A * 10/1994 Franklin et al. ............. 99/492
5,421,248 A * 6/1995 Hsu ............................ 99/512
5,921,485 A * 7/1999 Plavcan et al. ........... 241/282.2

* cited by examiner

*Primary Examiner*—Bena Miller
(74) *Attorney, Agent, or Firm*—Troxell Law Office, PLLC

(57) ABSTRACT

A food processor comprises a body provided therein with an operating motor, a cutting seat, and an upper cover. The cutting seat is disposed within a space formed above the body and is linked with the operating motor, so that the cutting seat and the operating motor are rotated simultaneously. The upper cover is mounted on an upper end of the body and is provided with an introduced pipe extending downwardly from its surface. The introduced pipe includes a first introduced passageway and a second introduced passageway, which are interconnected with each other. Vegetables, fruit, or other food is introduced into a material inlet of the two passageways and pushed tightly with a material-pushing plunger to render the vegetables, fruit, or other food cut by the cutting seat at a material outlet at the bottom of the introduced pipe.

2 Claims, 6 Drawing Sheets

FOOD PROCESSOR

BACKGROUND OF THE INVENTION

1. Field of the Invention

The present invention relates to a food processor and, more particularly, to a food processor provided with two interconnecting introduced passageways within the introduced pipe of the upper cover for processing vegetables, fruit, and other food of different sizes and for controlling effectively the volume to be processed.

2. Description of the Prior Art

People nowadays live in a rapid pace and the proportions of people eating out gradually get higher. To maintain a good health, it is important for people to select food and determine the proportions of food and beverages with an attention to take in different nutrients to balance the body need in addition to exercise and activities spending daily.

In recent years, people pursue eagerly good health by selecting the food they consume for getting good shape as well as health by taking nutrious food that which results in the popularity of organic food. The purpose of organic food is to produce the food without using any chemicals. The most popular organic food includes various vegetables, fruit, and their extracted juices. Therefore, now various food processors are used for processing vegetables, fruit and bean food to have the above food ground and extracted juices by squeezing from vegetables and fruit to allow people to consume nutrient supplement in a faster way.

Presently, food processors for processing vegetables and fruit in the market are usually provided on the surface of the machine with an introduced pipe. Food is introduced into a material inlet and cut or ground into juices by means of a high-speed rotating cutting and grinding disc in the machine. The introduced pipe is usually with a large diameter, so that it is allowed to fast cut or grind more vegetables and fruit each time after the above food is pushed tightly by a material-pushing plunger. However, the structure of the introduced pipe will give rise to a problem when thinner vegetables and fruit (such as radish) are cut, that is, it is possible for the cut vegetables and fruit to be sprung out of the introduced pipe to annoy users.

Besides, when the conventional food processors are used for grinding soybeans, rice, or other granules (such as peanuts), it usually needs to use a funnel or an amount-control container. Thereby, it is not only inconvenient for users but also increases the cost for manufacturing the additional funnel or container.

Moreover, after the soybeans, rice, or other granules are held into the funnel or the amount-control container and ground, the scrape is held in a food-scrapes container and the juice is held in a juice container. When the food-scrapes container or the juice container is full but the soybeans, rice, or other granules are not completely ground, if the power is off, the food processor will be stopped immediately and not able to be operated again because the residual food contacts the cutting disc. Users need to spend more time to pour out the residual food and clean up the processor before operating the processor for cutting or grinding the food again.

In order to overcome the shortcomings mentioned above to process vegetables, fruit of different sizes, also to low the manufacturing cost, and to control effectively the volume to be processed, the inventor had the motive to try and develop the present invention after hard research.

SUMMARY OF THE INVENTION

An object of the present invention is to provide a food processor, wherein an introduced pipe of an upper cover is provided with two introduced passageways for processing vegetables, fruit, or other food of different sizes.

Another object of the present invention is to provide a food processor with an introduced pipe of an upper cover including a first and a second introduced passageways, wherein, the vegetables, fruit, or other food can be pushed and positioned within the first introduced passageway by a material-pushing plunger, so that the volume of vegetables, fruit, or other food entering the second introduced passageway can be controlled.

Another object of the present invention is to provide a food processor, wherein the structure of the introduced pipe of the upper cover is provided for controlling the volume of vegetables, fruit, or other food to be processed, so that a funnel used conventionally is not necessary any more and the manufacturing cost can be lowered.

In order to achieve the above objects, the present invention provides a food processor comprising a body provided therein with an operating motor, a cutting seat, and an upper cover. The cutting seat is disposed within a space formed above the body and is linked with the operating motor, so that the cutting seat and the operating motor are rotated simultaneously. The upper cover is mounted on an upper end of the body and is provided with an introduced pipe extending downwardly from its surface, and in the end of the introduced pipe forms a material outlet. Thereby, vegetables, fruit, or other food is introduced into a material inlet of the introduced pipe and pushed tightly with a material-pushing plunger to render the vegetables, fruit, or other food to be cut at the material outlet by the cutting seat. The main improvement is that: the introduced pipe of the upper cover includes a first introduced passageway and a second introduced passageway, and the two passageways are interconnected with each other.

The following detailed description, given by way of examples and not intended to limit the invention solely to the embodiments described herein, will best be understood in conjunction with the accompanying drawings.

DETAILED DESCRIPTION OF THE PREFERRED EMBODIMENTS

Figure 1:
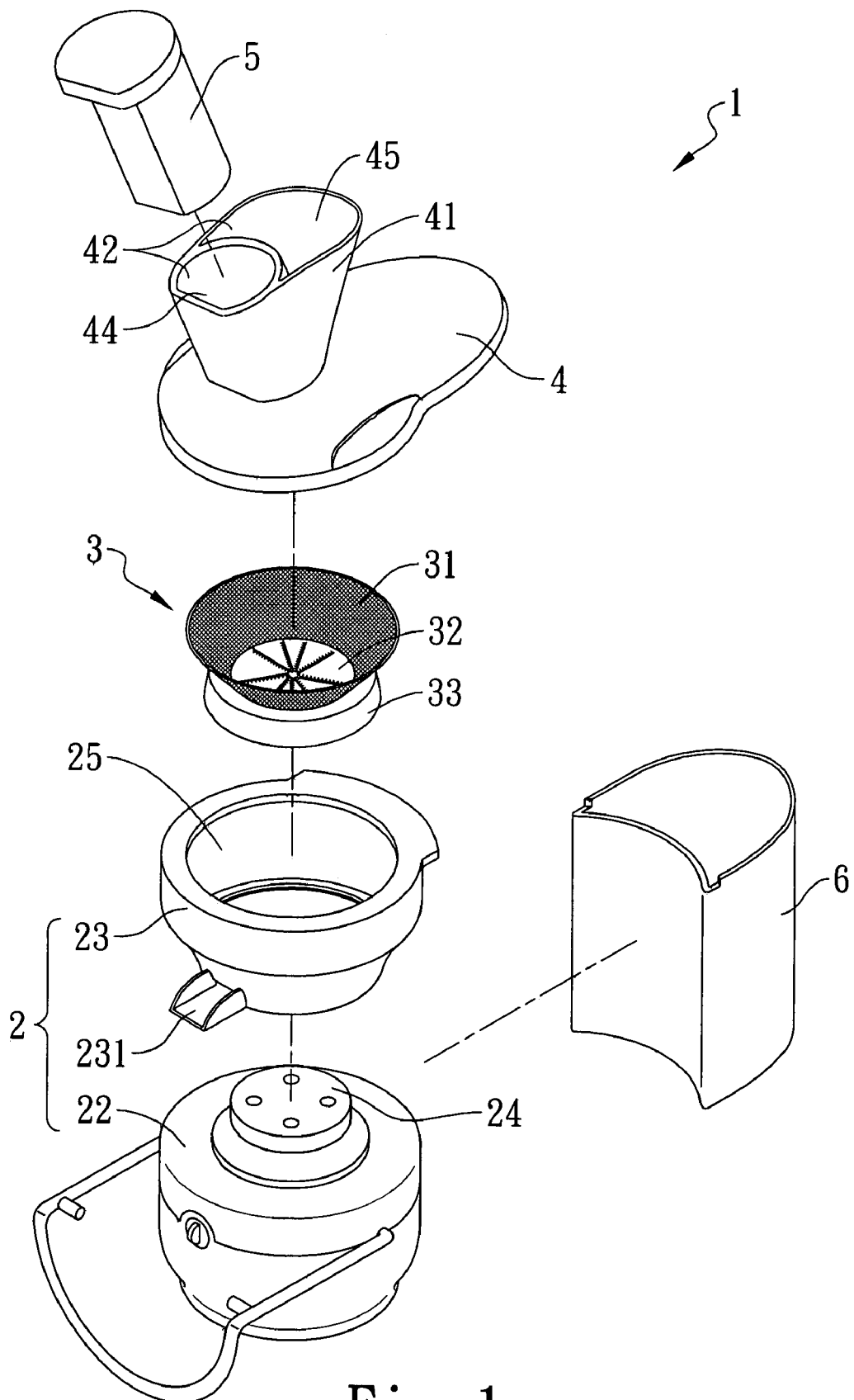
FIG. 1 is an exploded view of an embodiment of the present invention.
Figure 2:
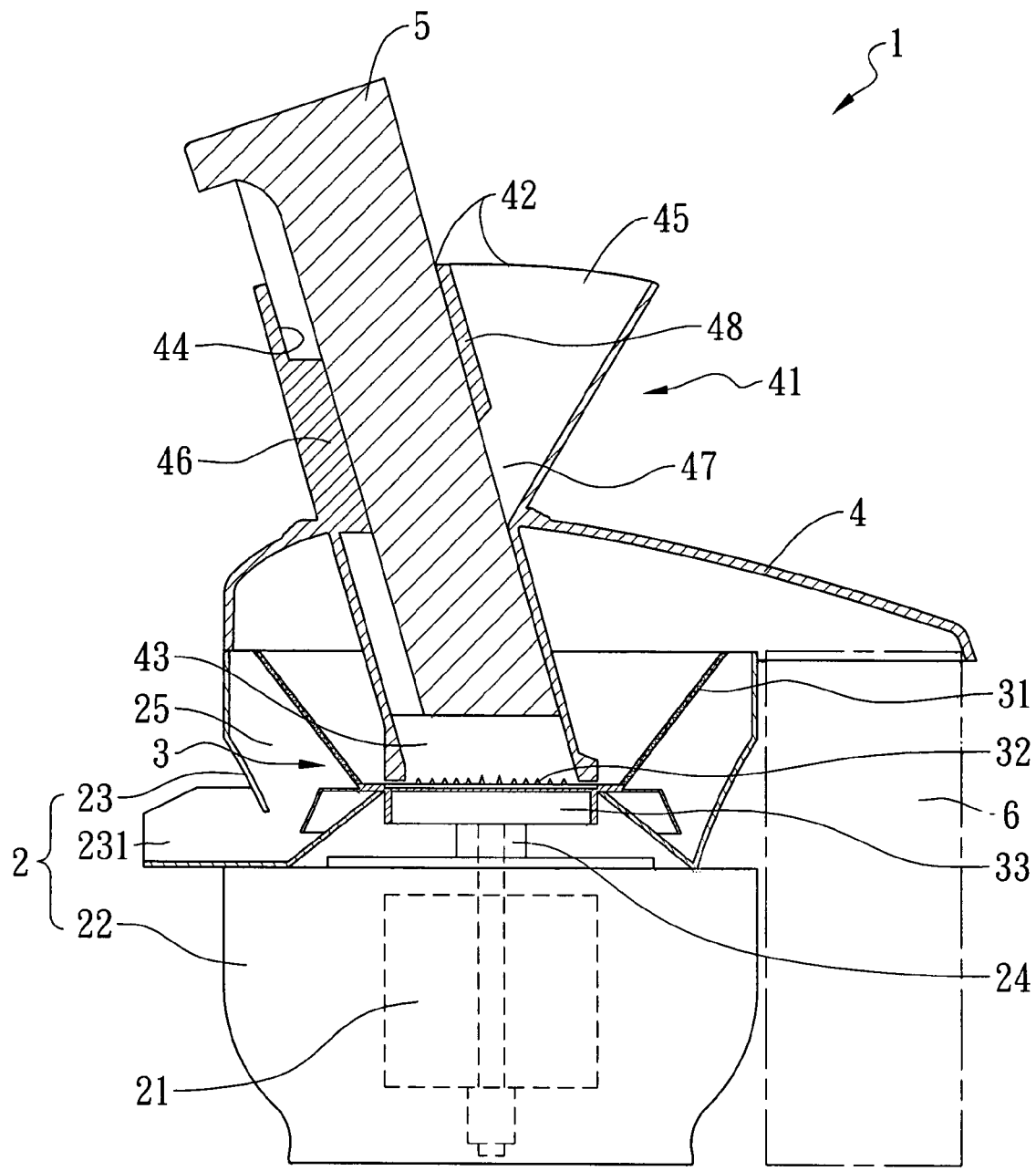
FIG. 2 is a sectional view of the embodiment of the present invention after being assembled.
Figure 3:
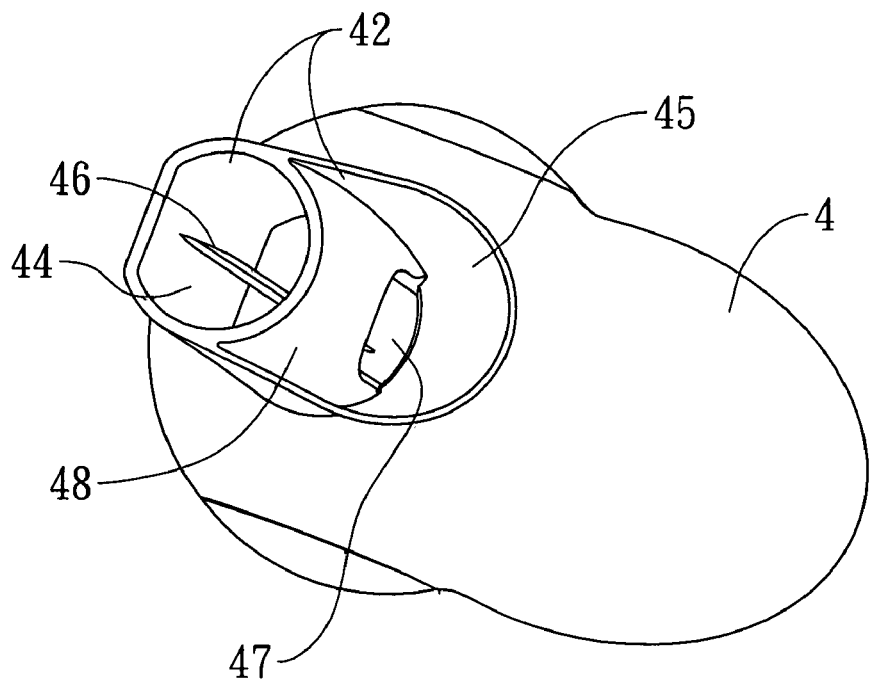
FIG. 3 is a perspective view of an upper cover of the embodiment of the present invention.

As shown in FIGS. 1-3, a food processor 1 according to the present invention comprises a body 2 having an operating motor 21 therein, a cutting seat 3, and an upper cover 4. The cutting seat 3 is disposed within a space 25 formed above the body 2 and is linked with the operating motor 21, so that the cutting seat 3 and the operating motor 21 are rotated simultaneously. The upper cover 4 is mounted on an upper end of the body 2 and is provided with an introduced pipe 41 extending downwardly from its surface. And in the upper end of the introduced pipe 41 forms a material inlet 42 and in the lower end thereof forms a material outlet 43. The introduced pipe 41 of the upper cover 4 includes a first introduced passageway 44 and a second introduced passageway 45. The two passageways 44, 45 are interconnected with each other, so that the vegetables, fruit, or other food introduced into the material inlet 42 of the first 44 or second introduced passageway 45 of the introduced pipe 41 can be pushed tightly by a material-pushing plunger 5 within the first introduced passageway 44 to render the vegetables, fruit, or other food cut at the material outlet 43 by the cutting seat 3.

In this embodiment, the food processor 1 further includes a food-scrapes container 6, and the body 2 includes a base 22 and a lower cover 23.

The base 22 is in the shape of a cylinder and slightly contracted at the bottom thereof. As shown in FIG. 2, the base 22 is provided therein with an operating motor 21. The operating motor 21 is provided on the upper end thereof with a connecting portion 24 rotatable synchronically with the operating motor 21. The connecting portion 24 protrudes out of the upper end of the base 22.

The lower cover 23 is mounted on the base 22, provided on the lower end thereof with a juice outlet 231, and has the space 25 therein.

The cutting seat 3 includes a filtering net 31, a knife disc 32, and a disc lid 33 for preventing downward leakage of the liquid produced during the vegetables, fruit, or other food is cut or ground. The cutting seat 3 is located in the space 25 of the lower cover 23. The knife disc 32 is provided on the upper end of the cutting seat 3 and is surrounded with the filtering net 31. The knife disc 32 is provided on the inner side of the upper surface thereof with a plurality of mutually spaced toothed knifes circularly arranged. The knife disc 32 also can be provided on the upper surface thereof with toothed knifes and ground-teeth for cutting and grinding food.

The upper cover 4 is mounted on the lower cover 23, and is provided with an introduced pipe 41 extending downwardly therefrom, which includes the first introduced passageway 44 and the second introduced passageway 45. The first introduced passageway 44 is oblique or vertical to the upper cover 4.

Figure 4:
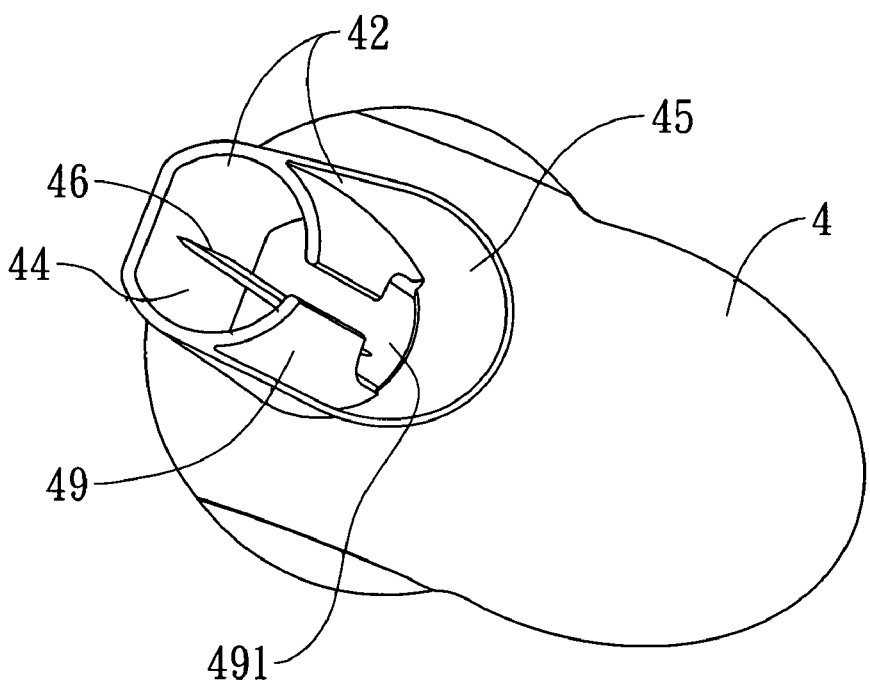
FIG. 4 is a perspective view of an upper cover in another preferred embodiment of the present invention.

The material-pushing plunger 5 can be moved up and down within the first introduced passageway 44. A baffle plate 46 protrudes within the first introduced passageway 44 for preventing users from putting their hands therein and for guiding the material-pushing plunger 5 moved in a constant direction. Besides, in the upper end of the introduced pipe 41 forms the material inlet 42 and in the lower end forms the material outlet 43. A division plate 48 with a through hole 47 is provided between the first 44 and the second 45 introduced passageways for interconnecting the two passageways 44, 45. As shown in FIG. 4, an open-ended division plate also can be provided between the two passageways 44, 45 for interconnecting the two passageways 44, 45.

Figure 5:
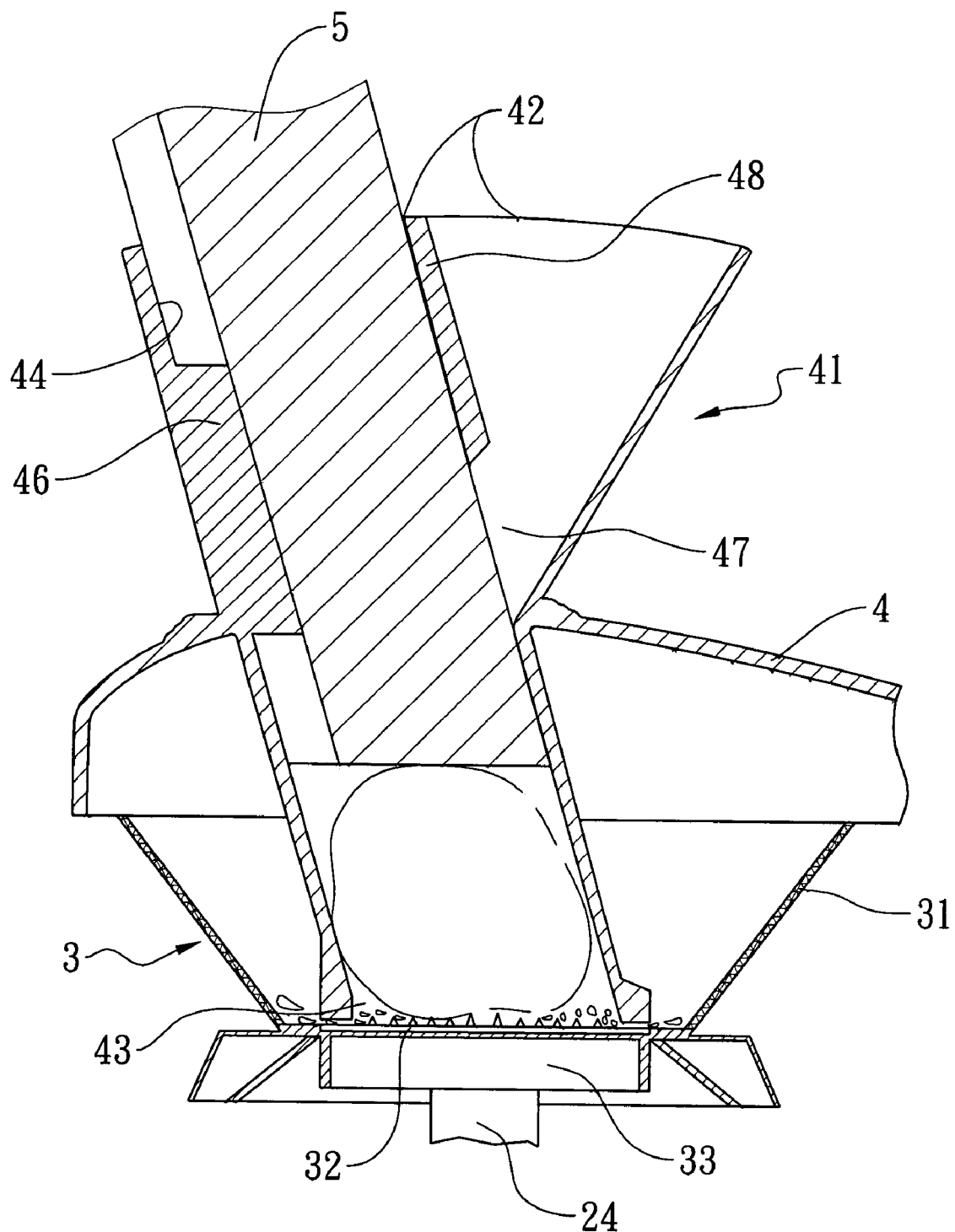
FIG. 5 shows the using state of the present invention, wherein larger vegetables, fruit, or other food is processed.
Figure 6:
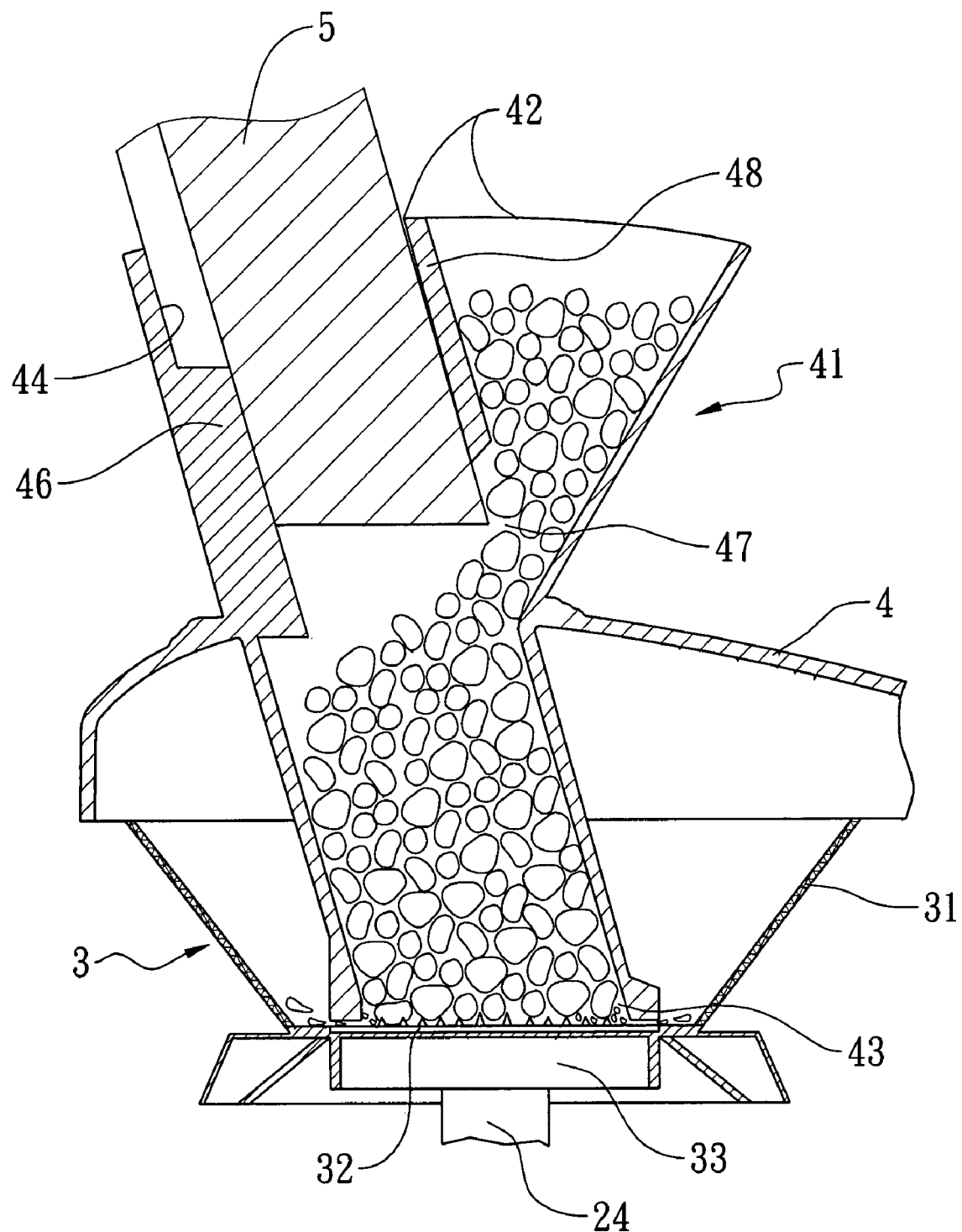
FIG. 6 shows the using state of the present invention, wherein smaller vegetables, fruit, or other food is processed.

As shown in FIG. 5, when the upper cover 4 covers the lower cover 23, the material outlet 43 of the introduced pipe 41 faces the knife disc 32 of the cutting seat 3. Larger vegetables, fruit, or other food is introduced into the material inlet 42 of the first introduced passageway 44 of the introduced pipe 41, pushed by the material-pushing plunger 5, and cut by the knife disc 32 at the material outlet 43. Smaller vegetables, fruit, or other food is introduced into the material inlet 42 of the second introduced passageway 44 of the introduced pipe 41 and then moved into the first introduced passageway via the through hole 47 to be pushed by the material-pushing plunger 5 and cut.

Figure 7:
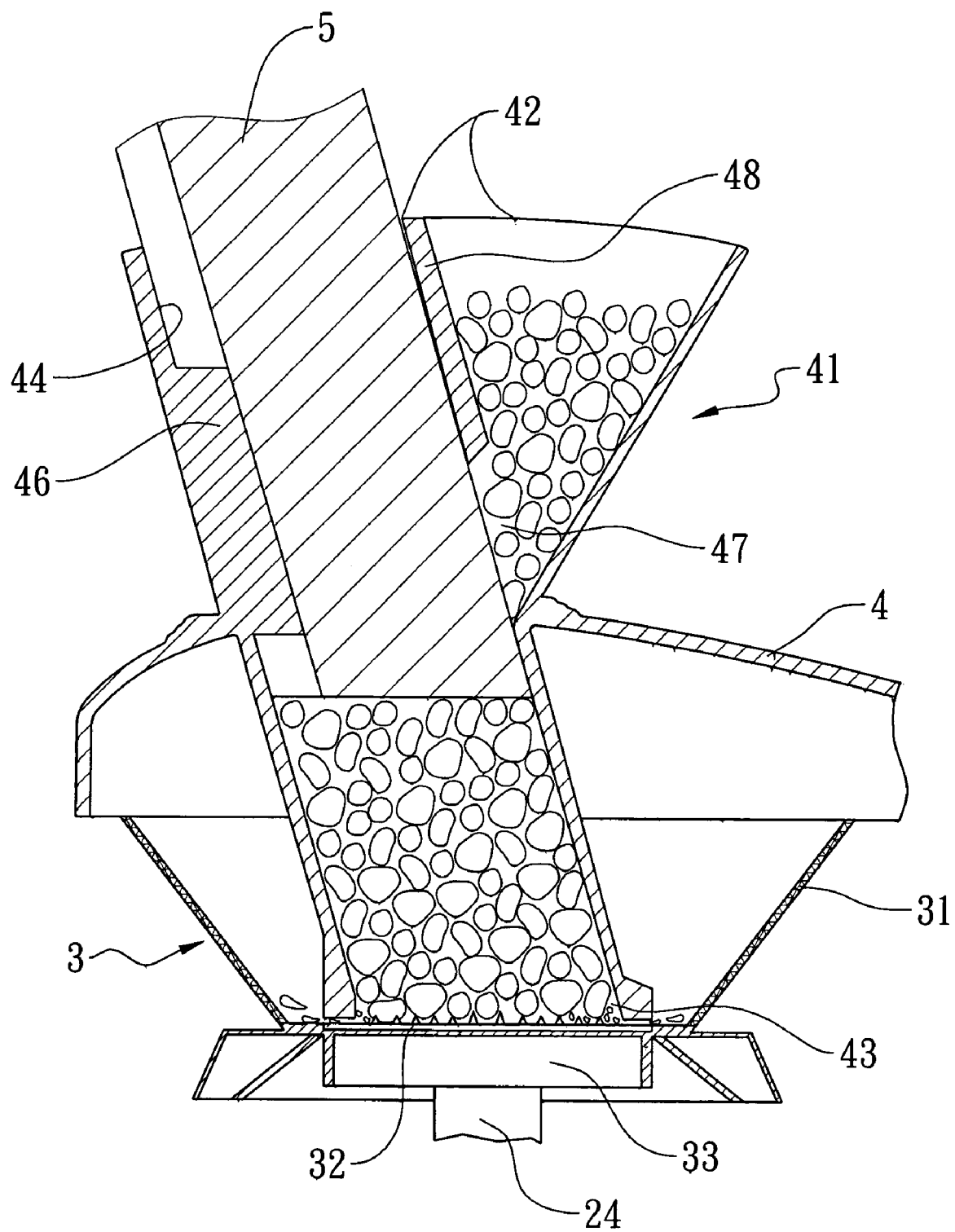
FIG. 7 shows another using state of FIG. 6.

As shown FIG. 7, in the condition that the smaller vegetables, fruit, or granules (such as soybeans, rice, or other granules) are cut or ground, when the food-scrapes container 6 or a juice container is full, users can block the two passageways 44, 45 by pushing the material-pusher plunger 5 downwardly to stop the processed food moving into the first introduced passageway 44 from the second introduced passageway 45 via the through hole 47.

Thereby, the present invention has the following advantages:

1. The introduced pipe of the present invention includes two introduced passageways interconnected with each other, so that users can process vegetables, fruit, or other food of different sizes without the processed vegetables, fruit, or other food springing out of the introduced pipe.
2. When cutting smaller vegetables, fruit, or other food, users can have vegetables, fruit, or other food moved into the first introduced passageway from the second introduced passageway to be processed without the need of taking out the whole material-pushing plunger.
3. When soybeans, rice, or other granules are ground, the second introduced passageway together with the through hole can perform the same function of a funnel. The granules can be prevented from moving into the second introduced passageway by pushing the material-pushing plunger into the first introduced passageway to block the through hole between the two passageways. Thereby, the volume of the granules entering the second introduced passageway can be effectively controlled, the cleansing time reduced, and operation efficiency increased.

Accordingly, as disclosed in the above description and attached drawings, the present invention can provide a food processor for processing vegetables, fruit, or other food of different sizes and for controlling the volume to be processed. It is new and can be put into industrial use.

It should be understood that different modifications and variations could be made from the teaching disclosed above by the people familiar in the art, without departing the spirit of the present invention.

What is claimed is:

1. A food processor, comprising a body provided therein with an operating motor, a cutting seat and an upper cover, wherein the cutting seat is disposed within a space formed above the body and is linked with the operating motor, so that the cutting seat and the operating motor are rotated simultaneously;

the upper cover is mounted on an upper end of the body and is provided with an introduced pipe extending downwardly from its surface, and in the lower end of the introduced pipe forms a material outlet;

thereby, vegetables, fruit, or other food introduced into a material inlet of the introduced pipe are pushed tightly with a material-pushing plunger to render the vegetables, fruit, or other food cut at the material outlet by the cutting seat;

the processor is characterized in that:

the introduced pipe of the upper cover includes a first and a second introduced passageway, and the two passageways are interconnected with each other, a division plate with a through hole being provided between the first introduced passageway and the second introduced passageway.

2. A food processor, comprising a body provided therein with an operating motor, a cutting seat and an upper cover, wherein the cutting seat is disposed within a space formed above the body and is linked with the operating motor, so that the cutting seat and the operating motor are rotated simultaneously;

the upper cover is mounted on an upper end of the body and is provided with an introduced pipe extending downwardly from its surface, and in the lower end of the introduced pipe forms a material outlet;

thereby, vegetables, fruit, or other food introduced into a material inlet of the introduced pipe are pushed tightly with a material-pushing plunger to render the vegetables, fruit, or other food cut at the material outlet by the cutting seat;

the processor is characterized in that:

the introduced pipe of the upper cover includes a first and a second introduced passageway, and the two passageways are interconnected with each other, an open-ended division plate being provided between the first introduced passageway and the second introduced passageway.

\* \* \* \* \*